United States Patent Office 3,008,989
Patented Nov. 14, 1961

3,008,989
1-[BICYCLO-(2,2,1)-5-HEPTENE-2-ENDO-
METHYL]-BIURET
Werner Richard Boehme, Somerville, and Joseph Nichols, Princeton, N.J., assignors to Ethicon, Inc., a corporation of New Jersey
No Drawing. Filed Mar. 3, 1958, Ser. No. 718,461
1 Claim. (Cl. 260—553)

The present invention relates to new pharmacologically effective ureidomethyl and thioureidomethyl bicyclic alkenes which have especially advantageous use as anticonvulsants. The new compounds of this invention are represented by the following general structural formula:

in which $R_1$ is hydrogen or a straight or branched-chain lower alkyl radical and preferably having not more than six carbon atoms, $R_2$ is hydrogen or a straight or branched-chain lower alkyl radical and preferably having not more than six carbon atoms, $R_3$ is hydrogen or a carboxamide radical, Z is oxygen or sulfur and Y is a methylene or ethylene radical.

The following structural formula shows the spatial relationships of the exo and endo positions of substituent groups on a bicycloheptene nucleus. Exo and endo positions of substituent groups have a corresponding spatial relationship on the bicyclo-octene nucleus.

The new compounds of the present invention have especially advantageous utility as anticonvulsants when employed in the treatment of epileptiform disorders. Among the compounds of the invention having outstanding utility are the following:

2-endoureidomethylbicyclo-(2,2,1)-5-heptene
2-endothioureidomethylbicyclo-(2,2,1)-5-heptene
2 - endomethyl - 2 - exoureidomethylbicyclo-(2,2,1)-5-heptene
2-endoureidomethylbicyclo-(2,2,2)-5-octene
2 - endo - (1 - methylureidomethyl) - bicyclo-(2,2,1)-5-heptene The novel compounds of this invention may be prepared by condensing a suitable aminomethyl bicyclic alkene with nitrourea or nitrobiuret, according to the method of Davis and Blanchard, Journal of the American Chemical Society, volume 51, page 1790 (1929). They may also be prepared by a reaction of the amine with phosgene followed by a reaction of the resulting isocyanate with ammonia, a primary or secondary alkyl amine.

The unsaturated bicyclic amines may be prepared by a Diels-Alder addition of a conjugate diene, such as cyclopentadiene, or 1,3-cyclohexadiene with allylamine or a substituted allylamine, according to the procedure of Alder and Windemuth, U. S. Patent No. 2,352,606, July 4, 1944, or by a selective reduction of the corresponding carboxamides with lithium aluminum hydride.

The novel thioureidomethyl bicyclic alkenes may be prepared by a reaction of the corresponding isothiocyanomethyl bicyclic alkene with ammonia or an alkyl amine.

EXAMPLE I 2-endoureidomethylbicyclo-(2,2,1)-5-heptene

A solution of 12.3 grams of 2-endoaminomethylbicyclo-(2,2,1)-5-heptene in 40 grams of ethanol is added to 10.5 grams of nitrourea dissolved in 250 cc. of water. The mixture is warmed at 60–70° C. for one and one-half hours and then cooled in an ice bath. The colorless plates which separate are purified by recrystallization from boiling water and the recrystallized product has a melting point of 120–121° C.

EXAMPLE II 2-endomethyl-2-exoureidomethylbicyclo-(2,2,1)-5-heptene

2 - endomethylbicyclo - (2,2,1)-5-heptene-2-exocarboxamide (melting point 158–159° C.), which is prepared according to the procedure of Beckmann et al., Berichte 87, p. 997 et seq. (1954), is reduced with lithium aluminum hydride in anhydrous ether solution. The resulting 2-endomethyl-2-exoaminomethylbicyclo-(2,2,1)-5-heptene has a boiling point of 70–71° C. at 9 mm. pressure. A mixture of 18.9 grams of the amine, and 16.8 grams of nitrourea in solution in 200 grams of 95 percent ethanol is refluxed for two hours and filtered. The filtrates are evaporated to dryness under reduced pressure. The solid residue is recrystallized from boiling water and the colorless plates which are obtained have a melting point of 134–135° C.

EXAMPLE III 2-endoureidomethylbicyclo-(2,2,2)-5-octene 2-endocyanobicyclo-(2,2,2)-5-octene, which is prepared according to the method of Alder, Krieger and Weiss, Berichte der Deutschen Chemischen Gesellschaft, volume 88, page 144 (1955), is reduced with lithium aluminum hydride in anhydrous ether solution. The resulting 2-endoaminomethylbicyclo-(2,2,2)-5-octene has a boiling point of 102–103° C. at 30 mm. pressure.

Gaseous hydrogen chloride is passed into a solution of the product in anhydrous ether and the crystalline hydrochloride salt precipitates as it is formed. The salt has a melting point above 300° C.

A solution of 13.7 grams of 2-endoaminomethylbicyclo-(2,2,2)-5-octene and 11.0 grams of nitrourea in 250 cc. of water and 100 grams of ethanol is heated at 80° C. for two hours. The solution is concentrated to one-half of its volume under reduced pressure and the precipitate is separated. The crude 2-endoureidomethylbicyclo-(2,2,2)-5-octene is purified by recrystallization from water and from ether and has a melting point of 120–121° C.

EXAMPLE IV 2-endo-(1-methylureidomethyl)-bicyclo-(2,2,1)-5-heptene

A solution of 10.3 grams of endo-N-methylaminomethylbicyclo-(2,2,1)-5-heptene [prepared by reacting 2-endobromomethylbicyclo-(2,2,1)-5-heptene (Alder and Windemuth loc. cit.) with methylamine at 130° C. for twelve hours] and 7.8 grams of nitrourea in solution in 125 grams of water and 25 grams of ethanol is warmed to 60° C. The solution is allowed to stand for several days, during which time the product separates in crystalline form. The crystalline product is recrystallized from boiling water and has a melting point of 162–165° C.

EXAMPLE V

1-[bicyclo-(2,2,1)-5-heptene-2-endomethyl]-biuret

A mixture of 25 grams of 2-endoaminomethylbicyclo-(2,2,1)-2-heptene and 29.6 grams of omega-nitrobiuret, which is prepared according to the method of Davis and Blanchard, loc. cit., in solution in 1000 cc. of water is refluxed for one and one-half hours. The viscous oil which separates on cooling is extracted with ether. The extract is dried with anhydrous sodium sulfate and the solvent is removed on the steam bath. The residue is recrystallized from aqueous ethanol and then from a mixture of toluene and isooctane and the recrystallized product has a melting point of 135–137° C.

EXAMPLE VI

*2-endothioureidomethylbicyclo-(2,2,1)-5-heptene*

Dry ammonia is passed into a vigorously stirred mixture of 33 grams of 2-endoisothiocyanomethylbicyclo-(2,2,1)-5-heptene, which is prepared according to the method of Alder and Windemuth, loc. cit., 300 grams of toluene and 50 cc. of water for one hour. The colorless crystalline precipitate which forms is purified by recrystallization from toluene and has a melting point of 120–121° C.

The novel ureido and thioureido bicyclic alkenes of this invention are tested for anticonvulsant activity by the method of Swinyard, Brown and Goodman, Journal of Pharmacology and Experimental Therapeutics, Volume 106, page 319 (1952), for measuring their action against electroshock-induced convulsions. The $LD_{50}$ values of the active substances are determined by oral administration to mice and calculated according to the method of Litchfield and Wilcoxson, Journal of Pharmacology and Experimental Therapeutics, Volume 96, page 99 (1949). The results of the determinations of anticonvulsant activity and the calculated $LD_{50}$ values are given in the table below in which the values in column I represent the dose which prevents, in fifty percent of the mice to which the substance was given orally, a tonic extensor component of the convulsion of the hind leg induced by a current strength of fifty milliamperes applied for a duration of two-tenths of a second. The values in column II represent the dose which causes neurological deficits in fifty percent of the mice to which the substance was given orally. The $LD_{50}$ values in column III represent the dose required to kill fifty percent of the mice to which the substance was given orally. All values in the table represent milligrams of substance per kilogram of body weight.

Following are the results in a representative number of compounds in this series.

| Compound | I | II | III | IV | V |
|---|---|---|---|---|---|
| 2-endoureidomethylbicyclo-(2,2,1)-5-heptene | 320 | 610 | 966 | 1.90 | 3.00 |
| 2-endomethyl-2-exoureidomethylbicyclo-(2,2,1)-5-heptene | 270 | 340 | 1,005 | 1.25 | 3.72 |
| 2-endoureidomethylbicyclo-(2,2,2)-5-octene | 240 | 520 | 1,240 | 2.16 | 5.17 |
| 2-endothioureidomethylbicyclo-(2,2,1)-5-heptene | 468 | 510 | 1,020 | 1.05 | 2.18 |

$$IV = \frac{II}{I} = \text{protective index}$$

$$V = \frac{III}{I} = \text{therapeutic index}$$

While the invention has been illustrated by certain individual specific embodiments, it is understood that variations, substitutions and modifications may be made to the extent of the scope of the appended claim.

This application is a continuation-in-part of prior application S.N. 573,612 now abandoned.

What is claimed is:

1-[bicyclo-(2,2,1)-5-heptene-2-endomethyl]-biuret.

References Cited in the file of this patent

UNITED STATES PATENTS 2,210,442    Balle et al. _____ Aug. 6, 1940

OTHER REFERENCES

Freund et al.: Berichte der Deutch. Chem. Gesell., vol. 21, page 2699 (1888).

Wallach: Chim. Zentral Blatt (1907), II, page 53.

Komppa et al. (512): Justus Liebig's Annalen der Chemie, vol. 512, page 180–181 (1934).

Komppa (68): Berichte der Deutch. Chem. Gesell., vol. 68, page 1270–1271 (1935).

Komppa et al. (523): Justus Liebig's Annalen der Chemie, vol. 523, page 79–80 (1936).

Alder et al.: Berichte der Deutch. Chem. Gesell., vol. 71, pages 1942 and 1953–54 (1938).

Wildman et al.: J.A.C.S., vol. 76, page 946–947 (1954).